United States Patent Office.

B. M. FOWLER, OF HACKENSACK, NEW JERSEY, ASSIGNOR TO HIMSELF AND WM. HANIGAN, OF BROOKLYN, NEW YORK.

IMPROVED MEAT COMPOUND.

Specification forming part of Letters Patent No. 51,259, dated November 28, 1865.

*To all whom it may concern:*

Be it known that I, B. M. FOWLER, of Hackensack, in the county of Bergen and State of New Jersey, have invented a new and Improved Meat Compound; and I do hereby declare that the following is a full, clear, and exact description thereof, which will enable others skilled in the art to fully understand and make use of the same.

The object of this invention is to prepare a compound of meat with the requisite quantity of salt and other spices in such a manner that the same can be kept for any length of time during all seasons of the year, and that it will form an exquisite relish for family consume or for travelers. For these reasons the compound may be properly termed "People's Excelsior Relish."

The ingredients which I use for my relish are, by preference, pork scraps, salt, pepper, and mustard, or for those last-named ingredients spices of any other description may be substituted. The proportion in which I mix these ingredients together is about as follows: pork scraps, 10 pounds; salt, 1 ounce; pepper, 1 ounce; mustard, 1 ounce.

The pork scraps are finely pulverized and then mixed with the salt, pepper, and mustard, and when intimately mixed the mass is formed in the shape of cheese or in any other form, and it is ready for immediate consumption, or it can be kept and preserved for future use.

I claim as new and desire to secure by Letters Patent—

A meat compound prepared as above specified.

BALTIS M. FOWLER.

Witnesses:
M. M. LIVINGSTON,
J. M. COVINGTON.